Dec. 31, 1929. W. C. LUNDSTROM 1,741,424
AUTOMOBILE DRESSING ROOM
Filed Sept. 3, 1927
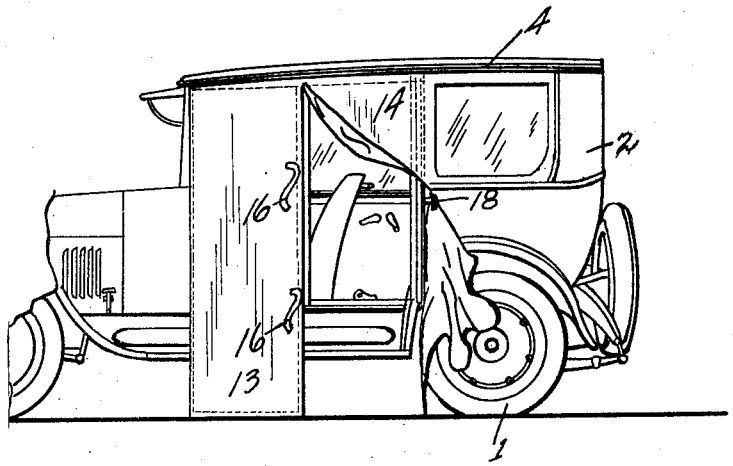
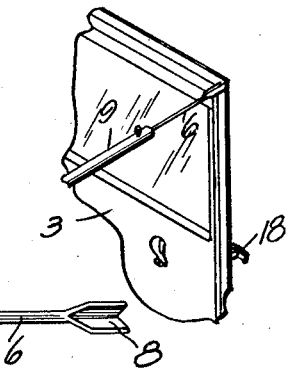
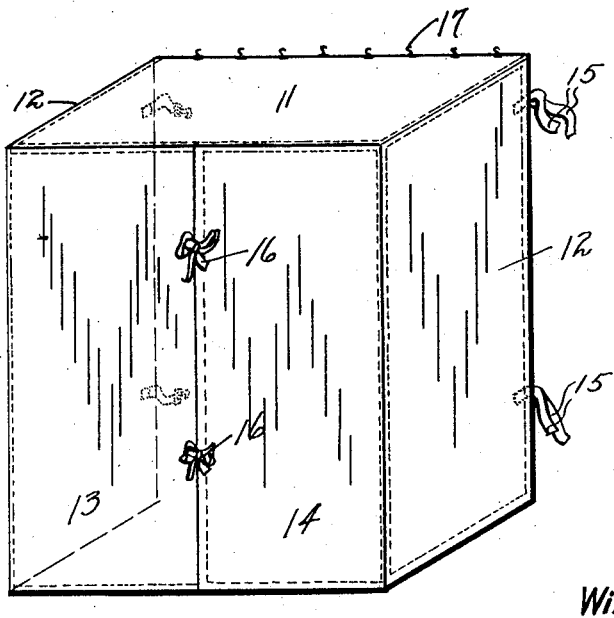
Inventor
William C. Lundstrom
By Herbert E. Smith
Attorney Patented Dec. 31, 1929

1,741,424

UNITED STATES PATENT OFFICE

WILLIAM C. LUNDSTROM, OF SPOKANE, WASHINGTON

AUTOMOBILE DRESSING ROOM

Application filed September 3, 1927. Serial No. 217,456.

My present invention relates to an improved automobile dressing room which is adapted for use especially with automobiles of the closed car type, and adapted for the utilization of the two doors at one side of the closed car.

The primary object of the invention is the provision of means which may readily be assembled and which may also be readily dismantled, for use in connection with the opened doors at one side of the closed car whereby a vestibule or enclosure may be provided and used as a dressing room for tourists who sleep in the automobile, or for bathers at bathing beaches or other places for the purpose of changing their attire.

The invention contemplates the use of a number of flexible panels in combination with a detachable frame bar which is used with the two open doors, and the walls of the enclosure are supported upon this bar and also by the use of a portion of the body of the automobile. The invention consists in certain novel combinations and arrangements of parts as will hereinafter be more clearly pointed out and claimed.

In the accompanying drawings, I have illustrated one complete example of the physical embodiment of my invention wherein the parts are combined and arranged according to the best mode I have so far devised for the practical application of the principles of my invention.

Figure 1 is a view in side elevation showing so much of a closed car as is necessary to illustrate the application thereto of the device of my invention;

Fig. 2 is a detail view showing a portion of a door and a portion of the frame bar used to join a pair of doors;

Fig. 3 is a detail view of the expansible frame bar that joins the two adjacent doors; and Fig. 4 is a perspective view showing the walls of the dressing room detached from the automobile.

In order that the general arrangement and relation of parts may readily be understood, I have shown the wheels 1, the body 2, and the doors 3 of a typical closed car which is provided with the usual bead 4 that forms part of the water trough running along the top side edges of the automobile.

When the device of my invention is put into use, the two doors 3 are opened wide so that they project at right angles from the body of the automobile and a frame bar or spreader bar is used to join the top outer corners of the two doors as indicated in Fig. 2. This spreader bar comprises a pair of sections 5 and 6 which at their ends are formed with angle lugs 7 and 8 that are adapted to fit over the upper outer corners of the hinged doors 3, as indicated in Fig. 2. An intermediate sleeve 9 is used to connect these sections 5 and 6 and set screws 10 are provided for retaining the sections in adjusted position with relation to the sleeve 9. The spreader bar is thus extensible for the purpose of adjusting it and adapting it for use with various automobiles, and for adjusting the space between the doors which support the spreader bar.

The enclosure is fashioned of waterproof material that is flexible, and the enclosure is supported on this spreader bar and on the bead 4 of the automobile. The enclosure comprises a top rectangular panel 11, two side panels 12, and two front panels 13 and 14 which overlap at the vertical center of the enclosure, and these overlapping panels may be turned back as flaps as indicated in Fig. 1 in order to gain entrance to or exit from the interior of the car and enclosure. At the inner edges of the two sides 12 are provided tie straps 15 which are utilized for connection with the hinges of the doors 3 for the purpose of fastening the inner edges of the enclosure to the automobile, and tie straps 16 are used for the overlapping edges of the front panels 13 and 14.

Hooks 17 are secured along the inner edge of the top panel 11 and these hooks are engaged over the bead 4 of the automobile body for securing the top of the enclosure to the top edge of the automobile.

The lower end or skirt portion of the enclosure as shown in Fig. 1 extends down to the ground surface, and the top of the enclosure is on the level with the top edges of the two open spaced doors. Thus, an enclosure of sufficient height is provided to accommodate a person within the enclosure, and the lateral width of the enclosure is governed by the width of the open doors 3. The spreader bar forms a rigid support for the outer top edge of the enclosure and the hooks 17 form a fastening means for attaching the top 11 of the enclosure to the automobile.

As before stated, the enclosure may be made of waterproof canvas or other flexible material in order that it may be folded into compact form and stored away in the car when not in use.

In Fig. 1, one of the front sections or panels as 14 is turned back and caught over a handle 18 of one of the doors 3 in order to ventilate the interior of the car, and to give entrance or exit to or from the car.

The enclosure forming the dressing room is especially adapted for use with automotive vehicles that are provided with convertible seats which are adapted for use as beds, and in such instance the enclosure forms a dressing room outside of the automobile body for the accommodation of the occupant of the car.

Having thus fully described my invention, what I claim as new and desire to secure by Letters Patent is—

1. The combination with a pair of spaced open doors and an automobile body, of a supporting device to spread said doors, an enclosure of flexible material supported on said device exteriorly of the doors, and means for connecting said enclosure with the car body.

2. The combination with the spaced open doors of an automobile, of an adjustable spreader bar adapted to engage the upper outer corners of said doors, and an enclosure comprising flexible walls and the top portion supported on said bar exteriorly of the doors.

3. The combination with the spaced open doors of an automobile and a spreader bar comprising telescoping sections having angle lugs for engagement with the respective doors, an enclosure of flexible material comprising a top, two side walls, and a pair of overlapping front sections, fastening devices on the top walls adapted to engage a portion of the automobile, and tie straps on the walls of the enclosure for the purpose described.

In testimony whereof I affix my signature.

WILLIAM C. LUNDSTROM.